United States Patent [19]

Ueda et al.

[11] 4,026,660
[45] May 31, 1977

[54] CRACK DETECTING MEANS FOR ROTOR BLADES OF ROTARY WING AIRCRAFTS

[75] Inventors: Kazuo Ueda, Kagamigahara; Takao Arima, Gifu; Kazunori Kanayama, Kagamigahara, all of Japan

[73] Assignee: Kawasaki Jukogyo Kabushiki Kaisha, Japan

[22] Filed: Apr. 13, 1976

[21] Appl. No.: 676,496

[30] Foreign Application Priority Data

Apr. 15, 1975 Japan .......................... 50-45710

[52] U.S. Cl. ........................ 416/61; 416/226
[51] Int. Cl.$^2$ ........................... B64C 27/32
[58] Field of Search .......... 416/61, 226; 340/248 E, 340/248 F

[56] References Cited

UNITED STATES PATENTS

| | | | |
|---|---|---|---|
| 3,517,900 | 6/1970 | Roussel | 416/61 X |
| 3,547,555 | 12/1970 | Jensen | 416/61 |
| 3,573,520 | 4/1971 | Dorshimer | 416/61 X |
| 3,912,200 | 10/1975 | Foral | 416/61 X |
| 3,981,611 | 9/1976 | Jensen | 416/61 |

Primary Examiner—Everette A. Powell, Jr.
Attorney, Agent, or Firm—Harold L. Stowell

[57] ABSTRACT

Rotary wing aircrafts include one or more rotors having a plurality of rotary blades. Each of the rotor blades has crack sensor in the form of an induction coil or conductive wire. The crack sensor is connected with a further induction coil to form a circuit of which inductance is changed when a crack is produced in the associated rotor blade. On a stationary part such as a stationary swash plate of the rotorcraft, there is provided a stationary induction coil which is brought into cyclical and electromagnetical co-operation with the further induction coil on the rotor as the rotor rotates. The stationary induction coil is connected with a load resistor and an oscillator in such a way that cracks in the rotor blades can be detected in the form of a voltage change at the load resistor.

9 Claims, 21 Drawing Figures

CRACK DETECTING MEANS FOR ROTOR BLADES OF ROTARY WING AIRCRAFTS

The present invention relates to means for detecting cracks in rotor blades for rotary wing aircrafts.

In rotary wing aircrafts such as helicopters, it is very important from viewpoints of flight safety to detect cracks in rotor blades as soon as they are produced. For this purpose, it has already been proposed to apply the hollow interior of each rotor blade with positive or suction pressure and detect pressure change which will be produced in the rotor blade when cracks are generated therein. It has also been proposed as an alternative way of detecting cracks to apply electrically conductive materials to rotor blades in such a manner that the conductive materials are simultaneously broken when cracks are produced in the rotor blades.

The aforementioned conventional techniques have been found satisfactory as far as detection of cracks is concerned, however, problems have been encountered in transmitting crack signals from rotating blades to stationary parts of the rotorcrafts. Conventionally, mechanical conducting arrangements including conductive slip-rings, or radio telemeter devices have been employed for the purpose, however, none of such conventional devices have been found satisfactory.

It should further be noted that the conventional devices have not been effective to detect cracks in rotor blades without having any adverse effects of changes in surrounding conditions such as ambient temperature and centrifugal forces.

The present invention has therefore an object to provide means for detecting cracks in rotor blades with minimum influence of surrounding conditions.

Another object of the present invention is to provide crack detecting means for rotor blades which include novel arrangements for transmitting crack signals from the rotor blades to stationary parts of rotary wing aircrafts.

A further object of the present invention is to provide means for detecting cracks in rotor blades in which crack signals are transmitted electromagnetically from the rotor blades to stationary parts of rotary wing aircrafts.

According to the present invention, the above and other objects can be accomplished, in rotary wing aircrafts including a stationary part and at least one rotor assembly having a plurality of rotor blades, by means for detecting cracks in the rotor blades, said detecting means comprising crack sensing means associated with each rotor blade so as to provide a change in an electrical property when a crack is produced in the rotor blade, first induction means provided on the rotor at least one for each rotor blade and connected with said crack sensing means to form circuit means of which inductance is changed in accordance with the change in the electrical property in the crack sensing means, second induction means provided on said stationary part of the rotary wing aircraft and adapted to co-operate with said first induction means, means for applying alternating power to one of the first and the second induction means to produce an output signal at the second induction means, means for discriminating the output signal of the second induction means to determine whether there is a crack in the rotor blade.

According to a preferable aspect of the present invention, the output signal representing one rotor blade is compared with that representing another rotor blade by comparing circuit means in such a manner that an output is produced when there is a crack in one of the rotor blades. This arrangement is found as being particularly effective to avoid adverse effects of atmospheric temperature change which may otherwise cause an error in the detecting means when the crack signal producing means is of such a type that senses a change in pressure in the associated rotor blade.

The above and other objects and features as well as the principle of the present invention will hereinafter be described in more detail taking reference to the accompanying drawings, in which.

Figure 1:
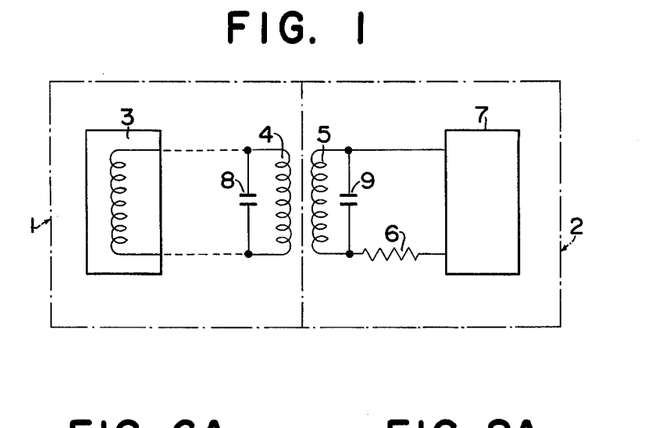
FIG. 1 is a schematic circuit diagram showing the principle of the present invention.

Referring now to the drawings, particularly to FIG. 1, there is shown a crack detecting circuit embodying the principle of the present invention in the most simplified form. The circuit comprises a movable section 1 which is carried by a rotor of a helicopter and a stationary section 2 which is carried by a stationary or non-rotating part such as a stationary swash plate of the helicopter.

The movable section 1 includes a sensor 3 which is shown in FIG. 1 in the form of an inductance. The sensor 3 is connected with an induction means 4 and a capacitor 8 is connected across the induction means 4. The stationary section 2 comprises a second induction means 5 which may be carried by a stationary swash plate of a helicopter in such a position that it is cyclically brought into co-operating position with respect to the first induction means 4 as the rotor rotates. The second induction means 5 is connected through a load resistor 6 with an oscillator 7 which is adapted to apply A.C. power to the second induction means 5. A capacitor 9 is connected in parallel with the second induction means 5.

Figure 2:
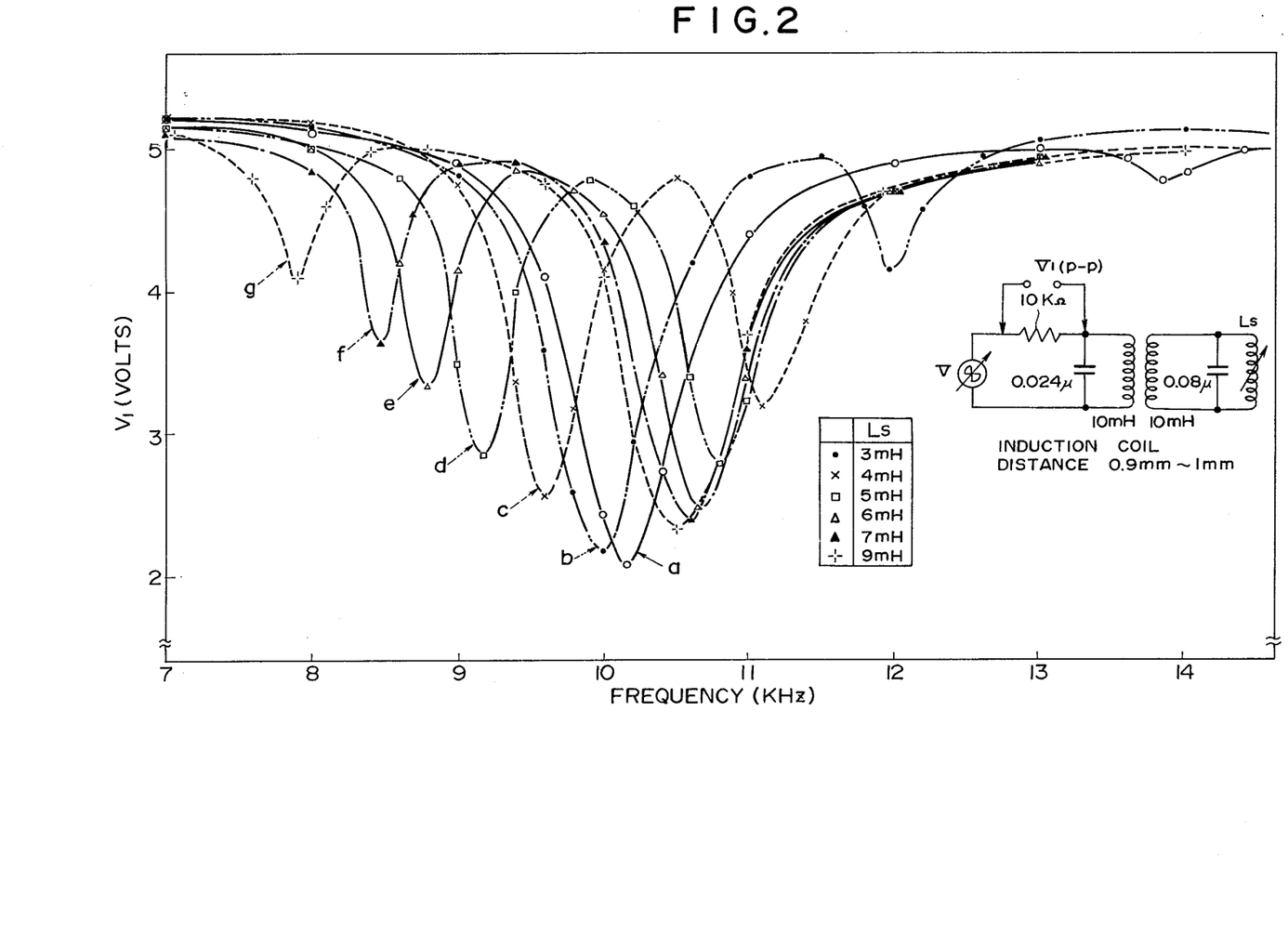
FIG. 2 is a diagram showing the influence of inductance of the induction means on the relationship between the output voltage and the frequency.

FIG. 2 shows the relationship between the voltage drop across the load resistor 6 and the frequency of the A.C. power applied by the oscillator 7. In FIG. 2, the curve $a\ a$ shows a change in the voltage drop when the first and second induction means 4 and 5 are not in co-operating relationship. Under this condition, it will be noted that the voltage drop across the load resistor 6 shows the minimum value at a specific value of frequency of the A.C. power applied to the induction means 5 due to parallel resonance in the second induction means 5 and the capacitor 9.

When the first and second induction means 4 and 5 are in such positions that they electromagnetically co-operate each other, the voltage drop across the load resistor 6 changes in accordance with the frequency of the A.C. power and the inductance of the sensor 3 as shown by curves $b, c, d, e, f$ and $g$. In FIG. 2, the curves $b$ through $g$ represents the voltage drop changes when the inductance of the sensor 3 is respectively 3, 4, 5, 6, 7 and 9 mH.

Figure 3:
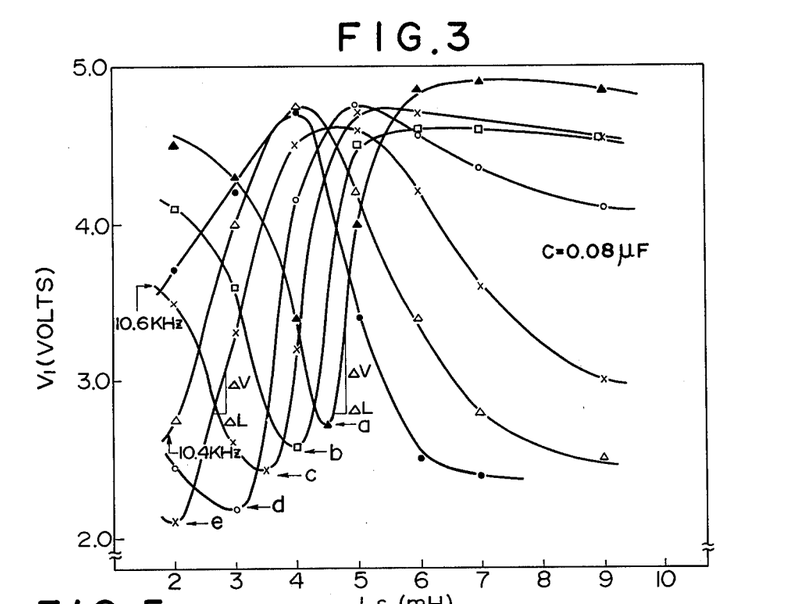
FIG. 3 is a diagram obtained from FIG. 2 and showing the relationship between the inductance of the induction means and the output voltage under a constant frequency.

FIG. 3 shows the relationship between the voltage drop across the load resistor 6 and the inductance of the sensor 3 with the frequency of the A.C. power from the oscillator 7 taken as a parameter. It will be noted in FIG. 3 that any change in the inductance of the sensor 3 can be transmitted to the stationary section 2 in terms of change in voltage drop across the load resistor 6. It will further be noted that, by properly determining the frequency of the A.C. power from the oscillator 7, it is possible to obtain an increased rate of amplification.

Figure 4:
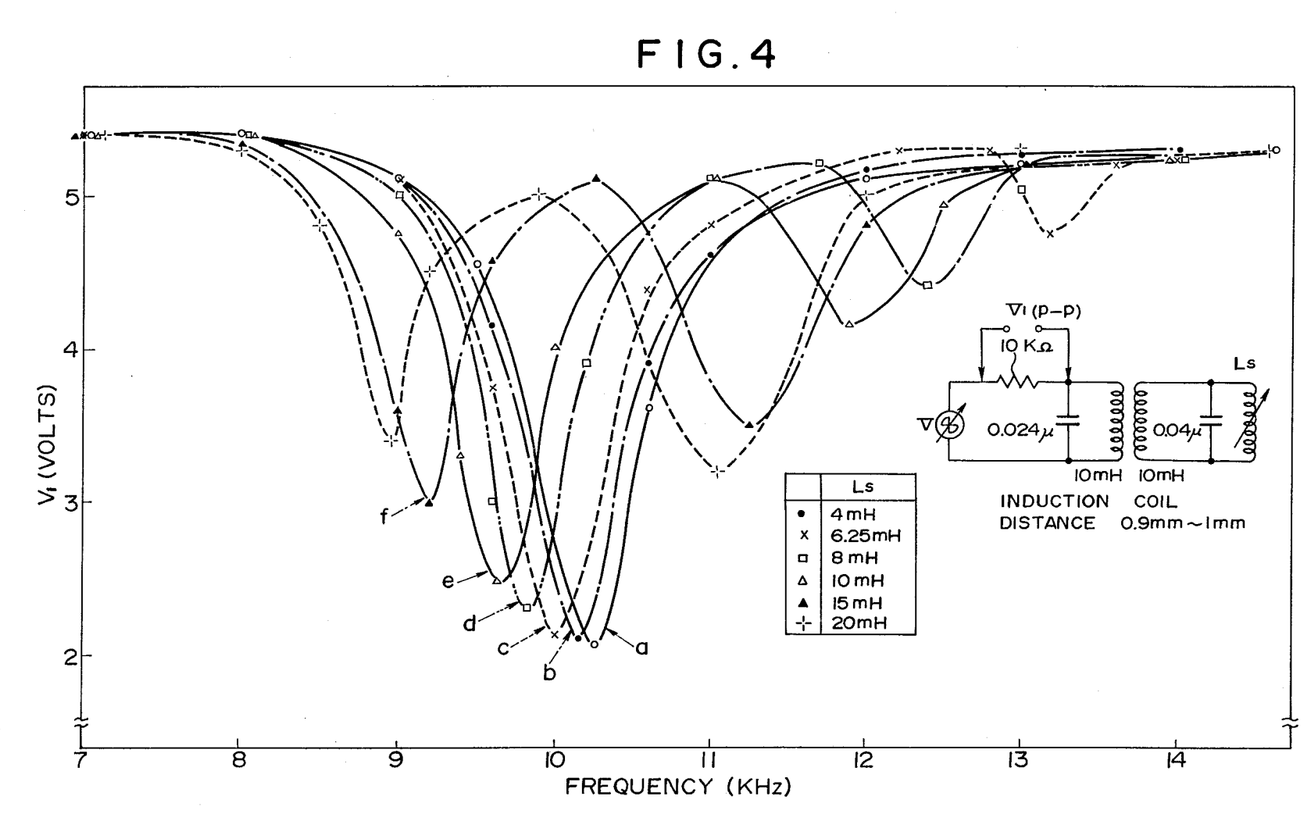
FIG. 4 is a diagram similar to FIG. 2 but showing the influence of capacitance.
Figure 5:
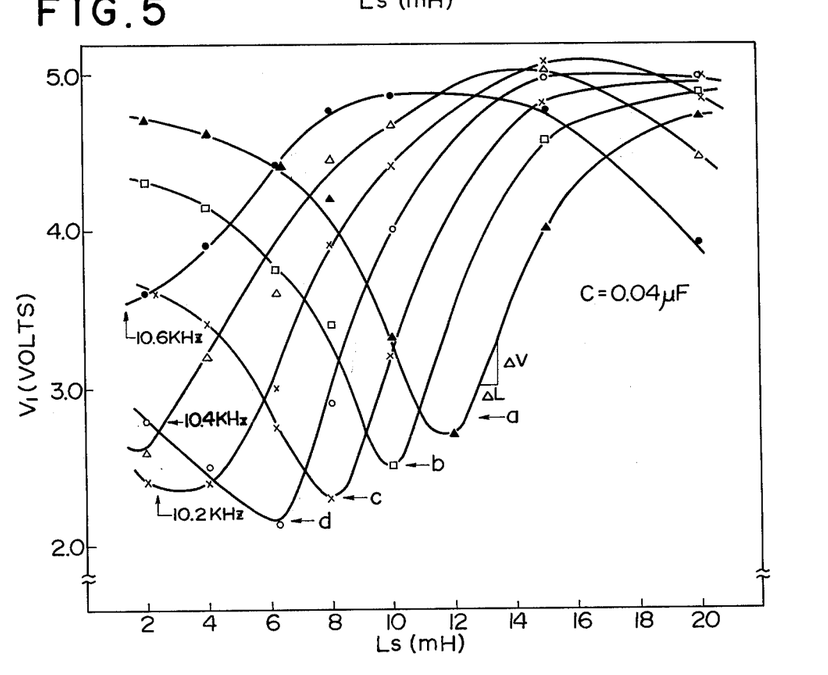
FIG. 5 is a diagram obtained from FIG. 4 and showing the relationship between the inductance of the induction means and the output voltage under a constant frequency.

FIGS. 4 and 5 are diagrams similar to FIGS. 2 and 3 respectively but showing the results obtained with the capacitance of the capacitor 8 smaller than that in the example of FIGS. 2 and 3. It will be noted in FIGS. 4 and 5 that, with a smaller value of the capacitor 8, there is a corresponding decrease in the ratio of the change in the voltage drop to the change in the inductance of the sensor 3.

Referring back to FIG. 1, when the induction element 5 is not in electromagnetically cooperating relationship with the induction element 4, maximum value of current flows through the induction element 5 and the capacitor 9 with 180° phase difference under resonance condition. In this instance, minimum value of current flows through the resistor 6.

Referring to the movable section 1, the sensor 3, the induction element 4 and the capacitor 8 constitute a circuit in which parallel resonating phenomenons are produced. When the circuit design is made in such a manner that the resonance in the circuit in the movable section 1 is produced at the same frequency as in the circuit in the stationary section 2, it will be understood that the induction element 5 can supply a greater amount of electric power to the element 4 under such conditions wherein there is maximum current flow in the element 5 and the circuit in the movable section 1 is in the parallel resonance. When the circuit in the movable section 1 is in the parallel resonance, minimum amount of current is allowed to flow through the circuit, so that the element 5 can supply minimum power to the element 4.

Referring to the load resistor 6, current passing therethrough will be of the lowest value under the parallel resonance when the induction element 5 is not in the electromagnetical co-operation with the element 4. When the induction elements 4 and 5 are in the electromagnetical co-operation with each other, the current through the load resistor 6 shows the highest value under the series resonance but the lowest value under the parallel resonance. Thus, it will be noted that any change in the inductance of the sensor 3 can be represented in terms of a change in current through the resistor 6. It should of course be noted that it is possible to obtain similar change in the current through the resistor 6 through a change in capacitor in the part of the sensor 3 in lieu of the change in inductance.

Figure 6A:
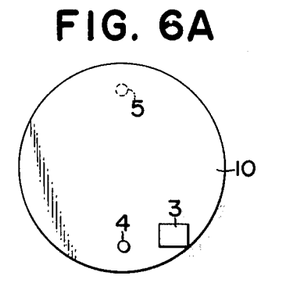
FIG. 6A is a diagrammatical plan view of a simplified signal transmitting device in which the concept of the present invention is embodied.
Figure 6B:
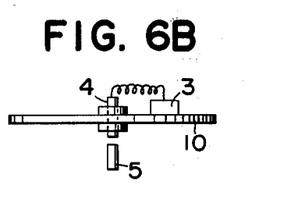
FIG. 6B is a side view of the device shown in FIG. 6A.

Referring now to FIGS. 6A and 6B, there is diagrammatically shown a practical arrangement of the components in the circuit shown in FIG. 1. The sensor 3 and the induction element 4 are mounted on a rotatable disc 10 and the induction element 5 is stationarily supported in such a position that it is cyclically brought into electromagnetical co-operation with the element 4 as the disc 10 rotates. It should of course be noted that the induction element 5 is connected with the load resistor 6, the oscillator 7 and the capacitor 9 in the manner as shown in FIG. 1 and adjustment is so made that the nominal level of current through the load resistor 6 is between the maximum and minimum values.

Figure 7:
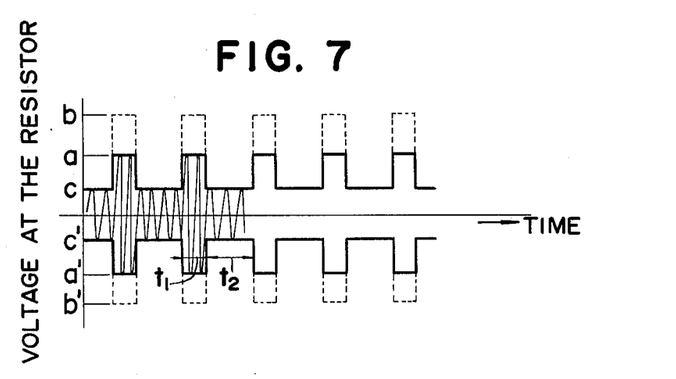
FIG. 7 is a diagram showing the output voltage across the load resistor in the circuit shown in FIG. 1.

As the disc 10 rotates, the induction element 4 is cyclically brought into co-operation electromagnetically with the stationary induction element 5 resulting in a cyclic change in the voltage drop across the load resistor 6 as shown in FIG. 7. In FIG. 7, the time interval $t_1$ represents the period wherein the induction elements 4 and 5 are in electromagnetic co-operation each other. In this period, the voltage drop across the resistor 6 has a preadjusted amplitude as represented by $a\ a'$. When the inductance or capacitance of the sensor 3 is changed in such a way that the resonance frequencies of the movable and the stationary circuits become equivalent with each other, the voltage drop across the resistor 6 increases as shown by $b\ b'$ in FIG. 7. The time interval $t_2$ shows the period wherein the induction element 5 is not electromagnetically affected by the element 4. In this instance, the stationary circuit constituted by the element 5 and the capacitor 9 is in parallel resonance so that the current through the resistor 6 is at the lowest level as shown by $c\ c'$ in FIG. 7. When the inductance or the capacitance of the sensor 3 is changed in such a way that the resonance frequency of the movable circuit 1 is more different from that of the stationary circuit 2 than before, the voltage drop across the resistor 6 also decreases to the level shown by $c\ c'$. Thus, it will be seen that the signal from the sensor 3 can be transmitted to the stationary section 2 in terms of the voltage drop across the resistor 6.

Figure 8A:
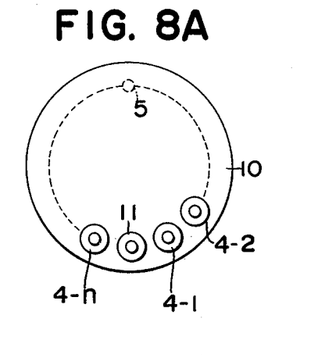
FIGS. 8A and 8B are views corresponding respectively to FIGS. 6A and 6B but showing another arrangement.
Figure 8B:
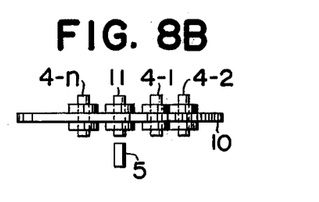
Figures 9, 10:
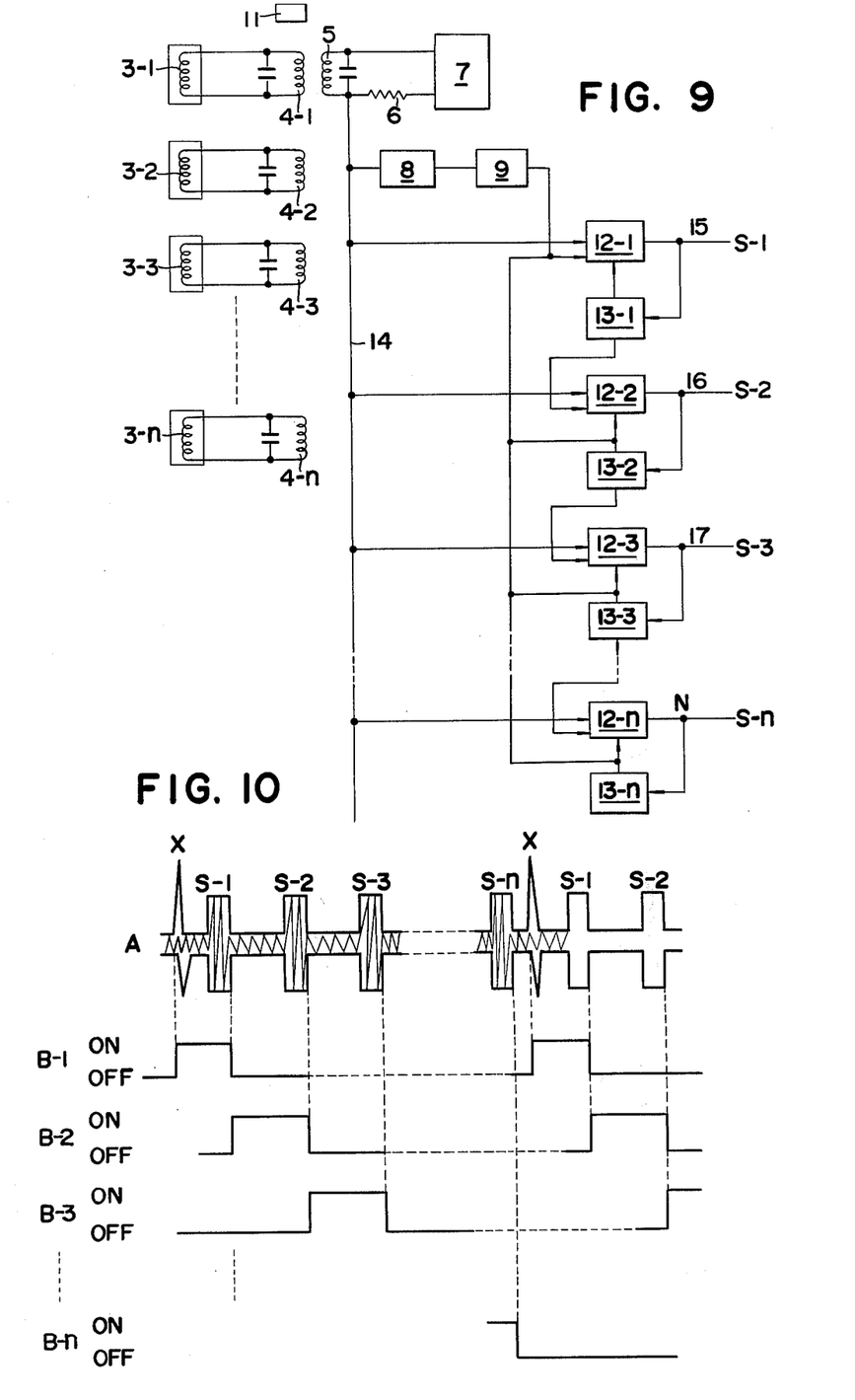
FIG. 9 is a schematic diagram showing a circuit which may be employed in the arrangement shown in FIGS. 8A and 8B.
FIG. 10 is a diagram specifically showing the function of gate means.

It is of course possible to provide a plurality of induction elements 4-1, 4-2, 4-3, . . . 4-n on the disc 10 as shown in FIGS. 8A and 8B. In order to have the individual induction elements properly identified, a permanent magnet 11 is disposed between the first element 4-1 and the last element 4-n. In this case, the elements 4-1, 4-2, 4-3, . . . 4-n, the element 5 and the magnet 11 are connected in the detecting circuit as shown in FIG. 9. More particularly, the induction elements 4-1, 4-2, 4-3, . . . 4-n are connected with sensors 3-1, 3-2, 3-3, . . . 3-n in a manner similar to that shown in FIG. 1. The induction element 5 are also connected with a load resistor 6 and an oscillator 7 as in FIG. 1. Further, one end of the resistor 6 is connected in series with a threshold circuit 8 such as a Schmitt circuit which functions with an input signal higher than a certain level, and a pulse generating circuit 9 which receives a signal from the circuit 8 and produces pulses of a predetermined polarity.

The end of the load resistor 6 is also connected through a line 14 with gate circuits 12-1, 12-2, 12-3, . . . 12-n which are also connected with the output line of the pulse generating circuit 9. The gate circuits 12-1, 12-2, 12-3, . . . 12-n respectively have output lines 15, 16, 17, . . . N to pass output signals S-1, S-2, S-3, . . . S-n, respectively. There is further provided a pulse generating circuit 13-1 which receives the output signal S-1 from the gate circuit 12-1 and produces an output pulse when the signal S-1 disappears. The output pulse of the circuit 13-1 is applied to the gate circuits 12-1 and 12-2. Similar pulse generating circuits 13-2, 13-3, . . . 13-n are provided as shown in FIG. 9.

In this arrangement, as the disc 10 rotates, the stationary induction element 5 are cyclically and sequentially brought into electromagnetical cooperation with the permanent magnet 11 and the movable induction elements 4-1, 4-2, 4-3, . . . 4-n to produce pulsating voltage at the resistor 6 as shown by the curves A in FIG. 10. It is possible and recommendable for the purpose of identification that a pulse of different wave form and different peak voltage can be produced by the co-operation of the induction element 5 with the permanent magnet 11 as shown by X in FIG. 10 as compared with signal wave forms S-1, S-2, S-3, . . . S-n which are produced through co-operation with the movable induction means 4-1, 4-2, 4-3, . . . 4-n.

The circuit 8 has a threshold level which is higher than the level of the signals S-1, S-2, S-3, . . . S-n but lower than the peak value of the pulse X so that only the pulse X is allowed to pass through the circuit 8. Thus, when the permanent magnet 11 comes into co-operation with the induction element 5, the pulse X is produced in the induction element 5 and passed through the circuits 8 and 9 into the gate circuit 12-1 to turn the same on. Thereafter, the first induction element 4-1 comes to a position wherein it co-operates with the induction element 5. Thus, a pulse S-1 is produced in the coil 5 and passed through the opened gate 12-1 to the line 15. The pulse S-1 is simultaneously introduced from the line 15 to the pulse generating circuit 13-1 which produces a pulse when the pulse S-1 in the line 15 disappears. The pulse produced in the circuit 13-1 is applied to the gate 12-1 to turn the same off and also to the gate 12-2 to turn the same on.

As the disc further rotates, a signal pulse S-2 is produced in the induction element 5 through co-operation with the induction element 4-2. The pulse S-2 is transmitted through the gate 12-2 which has been turned on at the preceeding step, into the line 16. As in the previous step, the pulse S-2 is used to turn the gate 12-2 off and to turn the gate 12-3 on. Similar steps are repeated sequentially until the last gate 12-n is turned off by the signal pulse S-n which has passed through the same gate 12-n.

FIGS. 11 through 14 show an example of the present invention as applied to a tandem rotor type helicopter.

Figure 11:
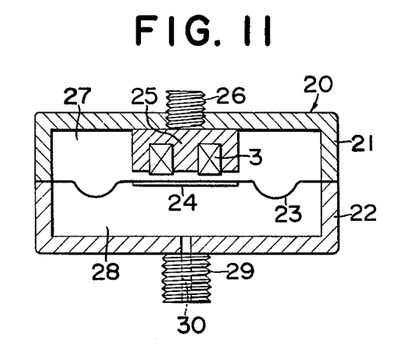
FIG. 11 is a sectional view showing an example of pressure type crack sensing means or a transducer.

In FIG. 11, there is a shown a pressure type crack sensing device which includes a hollow casing 20 comprising two casing halves 21 and 22. A flexible diaphragm 23 is disposed between the casing halves 21 and 22 so as to divide the interior of the casing 20 into a reference pressure chamber 27 and a signal pressure chamber 28. The diaphragm 23 carries a plate 2 of a ferromagnetic material which is positioned in opposing relationship with respect to a core 25 of ferromagnetic material carrying an induction coil 3.

The reference pressure chamber 27 is charged with a predetermined air pressure. Although not shown in FIG. 11, a filler valve is provided in the casing half 21 so that the chamber 27 can be charged with a desired air pressure. The signal pressure chamber 28 is connected with the interior of a rotor blade through a fitting 29 which has a bore or passage 30. The core 25 is mounted on the casing 20 by means of an adjusting screw 26 in such a manner that the spacing between the cores 24 and 25 can be adjusted as desired under a normal condition. Thus, it will be understood that the spacing between the cores 24 and 25 can be varied in accordance with the air pressure introduced into the signal pressure chamber 28 and, therefore, the inductance of the coil 3 can also be changed in response to a change in air pressure in the chamber 28.

Figure 12:
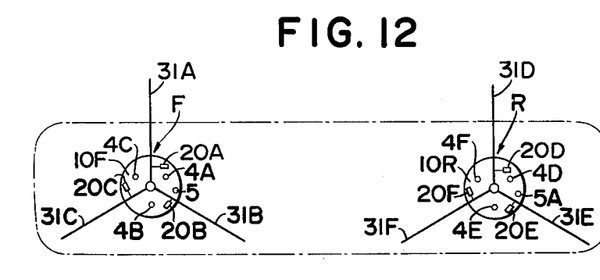
FIG. 12 is a diagrammatical plan view showing an example in which the present invention is embodied in a tandem rotor type helicopter.
Figure 13:
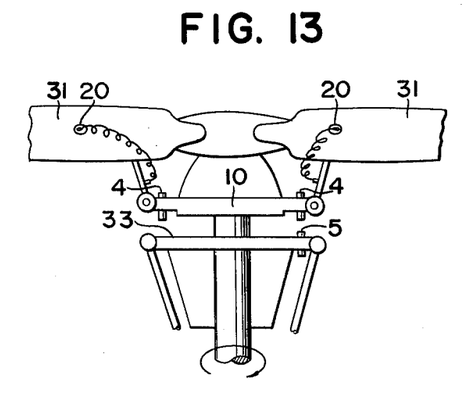
FIG. 13 is a fragmentary side view of a rotor portion of a helicopter in which the present invention is embodied.

Referring to FIG. 12, there is shown an actual arrangement in a tandem rotor type helicopter. The helicopter includes a front rotor assembly F and a rear rotor assembly R. The front rotor assembly F comprises a rotatable swash plate 10F and three rotor blades 31A, 31B and 31C. For each of the blades 31A, 31B and 31C, there is provided a crack sensing device as shown by 20A, 20B and 20C. Further, the swash plate 10F carries induction elements 4A, 4B and 4C which are associated with the rotor blades 31A, 31B and 31C, respectively. Similarly, the rear rotor assembly R comprises a rotatable swash plate 10R and three rotors 31D, 31E and 31F which are respectively provided with crack sensing devices 20D, 20E and 20F. Further, the swash plate carries induction elements 4D, 4E and 4F which are respectively associated with the blades 31D, 31D and 31F. As shown in FIG. 13, in each of the rotor assemblies, the casings 20 of the crank detecting devices are mounted on the root portions of the associated rotor blades 31. As well known in the field of helicopter design, the rotatable swash plate 10 is disposed above a stationary swash plate 33 which is under control of a control stick or other manual control member. In the illustrated arrangement, the induction elements are mounted on the upper or rotatable swash plate 10 and a co-operating stationary induction element 5 is carried by the lower or stationary swash plate 33.

Figure 14:
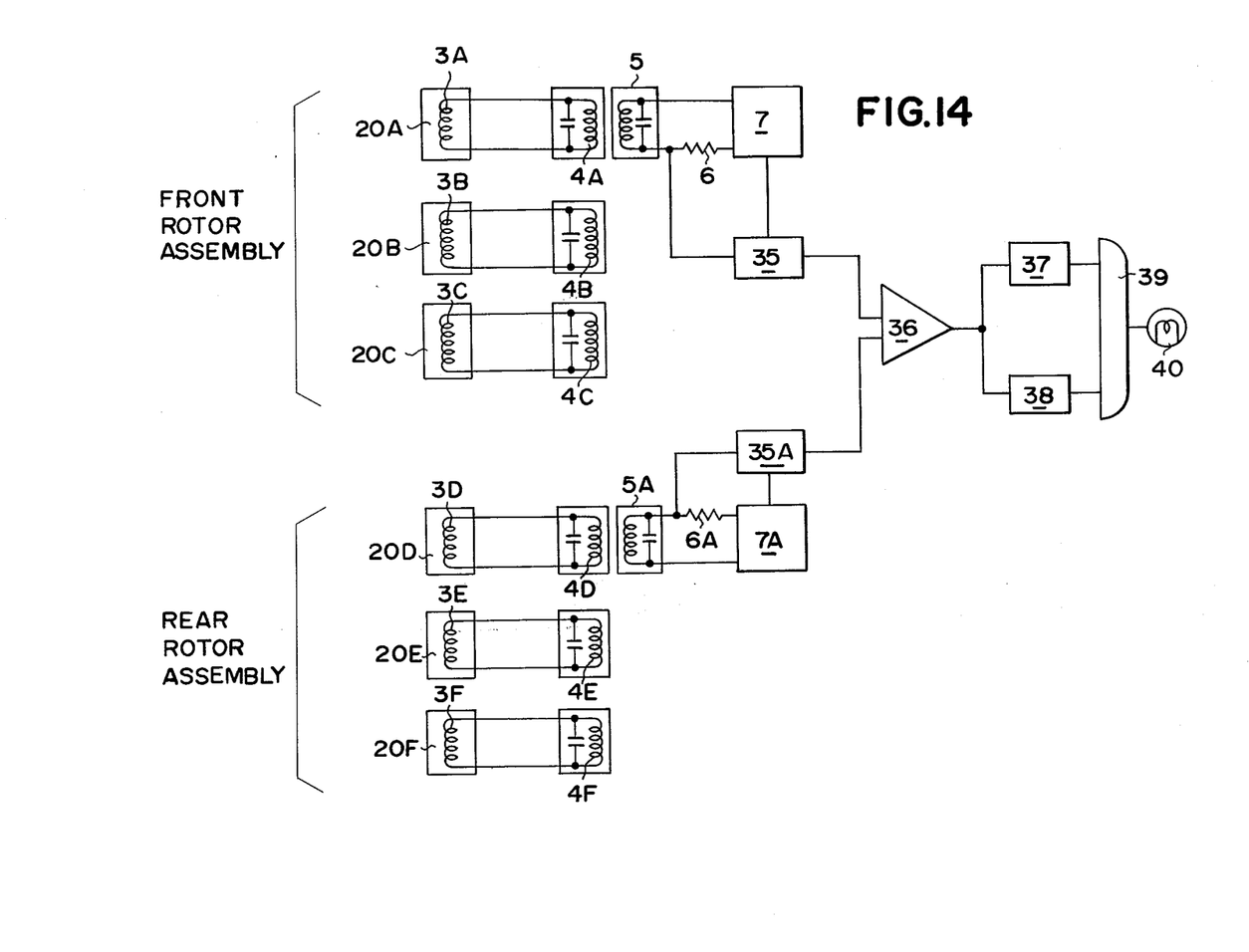
FIG. 14 is a schematic diagram showing the crack detecting circuit employed in the arrangement shown in FIG. 12.

FIG. 14 shows an example of electrical connection in the embodiment shown in FIGS. 11 through 13. The induction coils 3A, 3B and 3C in the crack detecting devices 20A, 20B and 20C for the front rotor assembly F are respectively connected with the induction elements 4A, 4B and 4C which are cyclically and sequentially brought into electromagnetic co-operation with the stationary induction element 5 as the rotor assembly rotates.

Similarly, the induction coils 3D, 3E and 3F in the crack detecting devices 20A, 20B and 20C for the rear rotor assembly R are respectively connected with the induction elements 4D, 4E and 4F. The stationary induction element 5A is so arranged that it is cyclically and sequentially brought into electromagnetic co-operation with the movable induction elements 4D, 4E and 4F as the rear rotor assembly rotates.

As in the arrangement shown in FIG. 1, the stationary induction element 5 is connected with an oscillator 7 and a load resistor 6. The induction element 5A is connected with a resistor 6A and an oscillator 7A. The resistor 6 and the oscillator 7 are connected with a synchronous rectifying circuit 35. Similarly, the resistor 6A and the oscillator 7A are connected with a synchronous rectifying circuit 35A. The output lines of the rectifying circuits 35 and 35A are connected with a comparison circuit 36 having an output line connected with counters 37 and 38. The output lines of the counters 37 and 38 are connected with an OR circuit 39 which is in turn connected with a warning lamp 40 or other indication device.

In this arrangement, the positions of the induction elements 5 and 5A are so determined that corresponding pair of induction elements for the front and rear rotor assemblies, for example, the elements 4A and 4D; 4B and 4E; and 4C and 4F are simultaneously brought into electromagnetic co-operation with the stationary induction elements 5 and 5A, respectively. Further, the crack sensing devices 20A, 20B, 20C, 20D, 20E, and 20F are adjusted by means of the screws 26 in such a way that no output signal appears in the comparison circuit under a normal condition.

Figure 15:
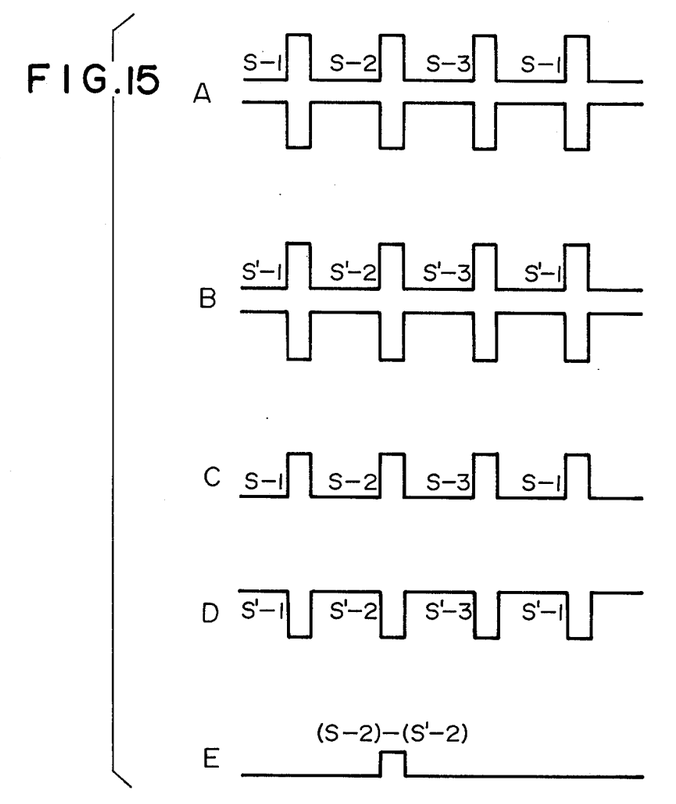
FIG. 15 schematically shows wave forms of output signals which appear in the circuit shown in FIG. 14.

In operation, as the front and rear rotor assemblies rotate, there are produced output signal pulses S-1, S-2, S-3; S'-1, S'-2, S'-3 at the resistors 6 and 6A through co-operation of the induction elements 5 and 5A with the elements 4A, 4B, 4C; and 4D, 4E, 4F as shown by the curves A and B in FIG. 15. The signal from the resistor 6 is rectified by the circuit 35 to produce a signal shown by the curve C in FIG. 15. Similarly, the signal from the resistor 6A is rectified by the circuit 35A to form a signal shown by D in FIG. 15. The signals are compared by the circuit 36 which does not produce any output when the signals C and D are of the same level.

When crack prevails in one of the rotor blades, pressure leakage through the crack causes a change in pressure in the signal pressure chamber 28 in the casing 20 shown in FIG. 11. This is converted into a change in the inductance of the coil 3 so that there will be a change in the signal level at the load resistor 6 or 6A as will be understood from the foregoing discussions. Thus, there will be produced a difference in levels of the outputs from the circuits 35 and 35A. Then, the comparison circuit 36 produces an output signal as shown by E in FIG. 15.

The arrangement is particularly effective to eliminate influence of the ambient temperature change. The pressure in the rotor blade as well as the pressure in the reference pressure chamber are apparently functions of the ambient temperature. Since the interior of the rotor blade is of different volume as compared with the reference pressure chamber in the crack sensing device, the pressure change in the rotor blade due to a change in the ambient temperature will not be the same as that in the reference pressure chamber. Therefore, it is practically impossible to avoid any change in the level of the output signal at the load resistor. However, in the aforementioned arrangement, signals from two rotor blades are compared to determine whether or not there is a crack in either of the blades, so that it is possible to compensate for the influence of the ambient temperature change.

The output of the comparison circuit 36 is introduced into bit counters 37 and 38. In the illustrated example, the counter 37 is employed for counting positive signal pulses and the counter 38 for negative signal pulses. The counters 37 and 38 function in such a manner that they produce outputs only when a predetermined number of pulses are applied thereto. The counters 37 and 38 are therefore effective to prevent the lamp 40 from being turned on due to error signals such as electric noises which may inadvertently but non-cyclically be produced during operation.

Figure 16:
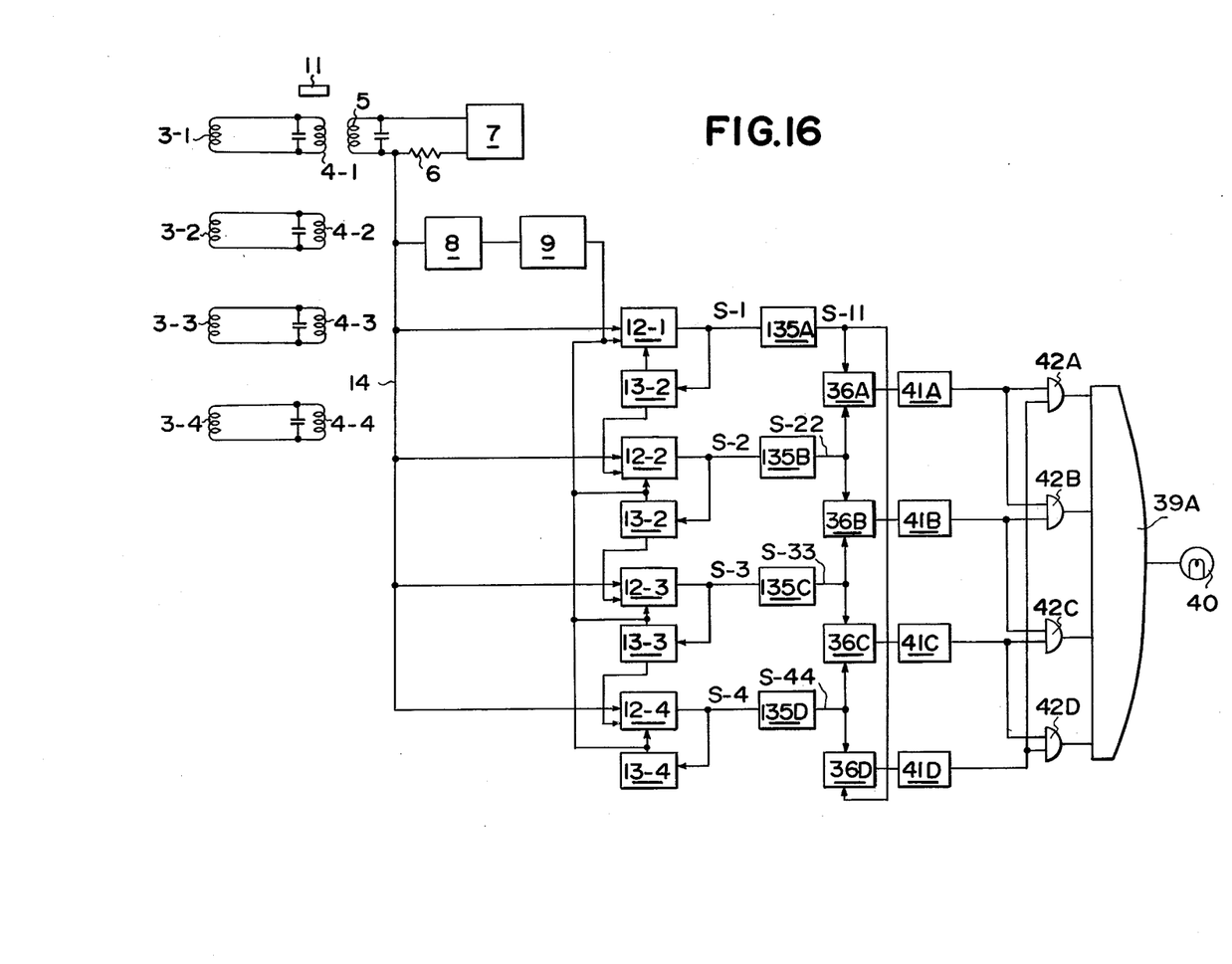
FIG. 16 is a schematic diagram of the crack detecting circuit which may be employed in a single rotor type helicopter.

FIG. 16 shows a further embodiment of the present invention as applied to a signal rotor type helicopter having four rotor blades. The rotor blades are provided with sensors 3-1, 3-2, 3-3 and 3-4 one for each blade, which are connected with induction elements 4-1, 4-2, 4-3 and 4-4, respectively. A stationary induction element 5 is provided in a stationary part such as a non-rotatable swash plate of the helicopter, and connected with a load resistor 6 and an oscillator 7 as previously discussed. The voltage at the resistor 6 is taken out at the line 14 and connected with a Schmitt circuit 8, a pulse generating circuit 9, gate circuits 12-1, 12-2, 12-3, and 12-4, and pulse generating circuits 13-1, 13-2, 13-3 and 13-4 in a manner as discussed in connection with FIG. 9. The outputs S-2, S-2, S-3 and S-4 from the gate circuits 12-1, 12-2, 12-3 and 12-4 are respectively applied to synchronous rectifying circuits 135A, 135B, 135C and 135D so that they are rectified to form D.C. signals. With the same pressures in the rotor blades and with the same values of inductance at the sensors 3-1, 3-2, 3-3 and 3-4, the levels of D.C. outputs S-11, S-12, S-13 and S-14 at the rectifying circuits 135A, 135B, 135C and 135D will be substantially the same. Thus, in the illustrated arrangement, the outputs of the rectifying circuits 135A and 135B are connected with a comparison circuit 36A. Similarly, comparison circuits 36B, 36C and 36D are provided to receive outputs from the circuits 135B and 135C; 135C and 135D; and 135D and 135A, respectively. As far as the outputs of each of the above circuit pairs are the same with each other, no output is produced in each comparison circuit 36, however, if there is any change in the inductance of one of the sensors, such as the sensor 3-1, outputs are produced in the comparison circuits 36A and 36D.

The comparison circuits 36A, 36B, 36C and 36D are respectively connected with pulse generating circuits 41A, 41B, 41C and 41D each of which produces a signal pulse when it is applied with a signal from the associated comparison circuit. There are provided AND circuits 42A, 42B, 42C and 42D, and the pulse generating circuit 41A is connected at its output line with the circuits 42A and 42B. Similarly, the output lines of the circuits 41B, 41C and 41D are respectively connected with the circuits 42B and 42C; 42C and 42D; and 42D and 42A. The AND circuits 42A, 42B, 42C and 42D are connected with an OR circuit 39A which is in turn connected with a warning lamp 40 or other indication device.

In this arrangement, the signal from one rotor blade is compared with the signals from two other rotor blades, so that cracks can be found with high degree of reliability. It is of course possible as in the previous example to insert digit counters so as to eliminate erroneous indications due to electric noises. Further, the outputs of the AND circuits 42A, 42B, 42C and 42D may be introduced to a digit display tube so as to make it possible to indicate the rotor blade in which cracks are found.

Figure 17:
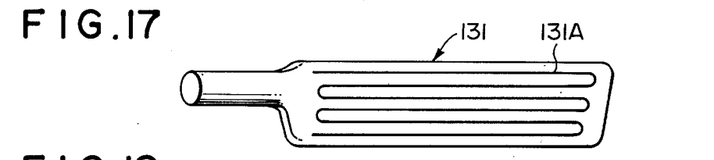
FIG. 17 is a plan view of a rotor blade having a crack sensing conductor disposed therein.
Figure 18:
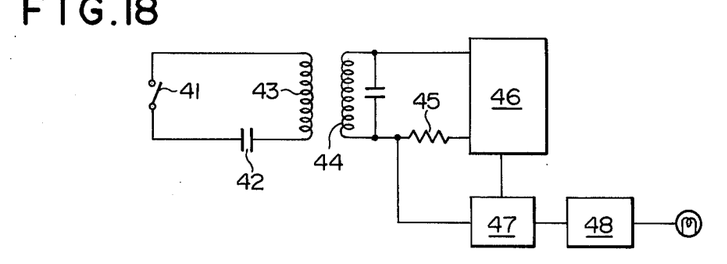
FIG. 18 is a schematic diagram showing the crack detecting circuit which can be used with the rotor blade shown in FIG. 17.

FIGS. 17 and 18 show an embodiment in which the crack sensing device includes an electrically conductive wire which is adapted to be broken when cracks are produced in the associated rotor blade. In FIG. 17, there is shown a rotor blade 131 having an electrically conductive wire 131A embedded or attached thereto. Referring to FIG. 18, the conductive wire 131A is schematically represented by a switch 41 which is adapted to be opened when cracks are produced in the associated rotor blade.

The switch 41 is connected in series with a capacitor 42 and an induction element 43 to form a resonance circuit. A second induction element 44 is disposed in electromagnetical co-operation with the induction element 43. As in the previous embodiments, the induction element 44 is connected with a load resistor 45 and an oscillator 46. The voltage at the resistor 45 is applied to a synchronous rectifying circuit 47 which is in turn connected with a comparison circuit 48. Thus, it will be seen that, when the switch 41 is opened due to breakage of the conductive wire 131A shown in FIG. 17, there will be a change in the voltage at the resistor 45, the voltage change being taken out as a crack signal.

Figure 19:
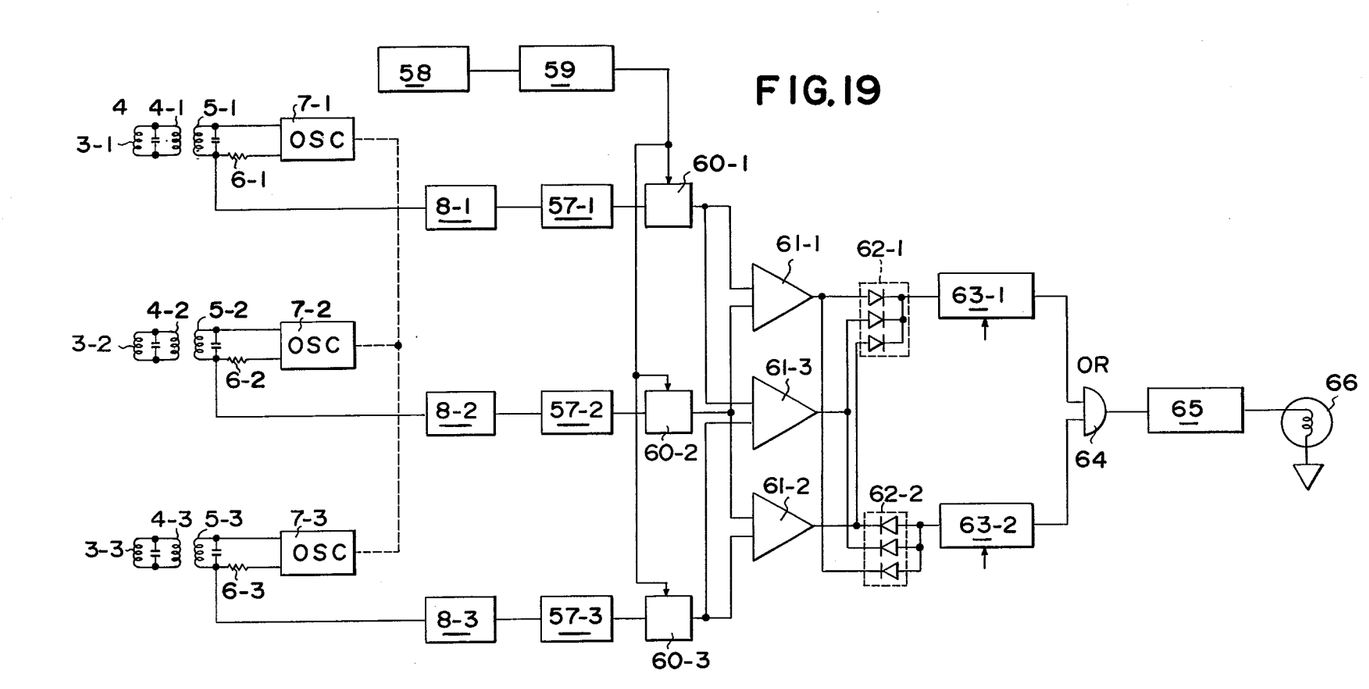
FIG. 19 is a block diagram showing the crack detecting circuit in accordance with a further embodiment of the present invention.

Referring to FIG. 19, there is shown a further embodiment of the present invention. As in the previous embodiments, crack sensors 3-1, 3-2 and 3-3 are connected with induction elements 4-1, 4-2 and 4-3, respectively. Induction elements 5-1, 5-2 and 5-3 are provided on stationary part of the helicopter in such a manner that they are cyclically brought into electromagnetic co-operation with the induction elements 4-1, 4-2 and 4-3, respectively. The induction elements 5-1, 5-2 and 5-3 are respectively connected with resistors 6-1, 6-2 and 6-3, and oscillators 7-1, 7-2 and 7-3.

The voltage at the resistor 6-1 is applied to a rectifying circuit 8-1 which is in turn connected with an amplifier 57-1. Similarly, the resistors 6-2 and 6-3 are respectively connected with rectifying circuits 8-2 and 8-3 which are respectively connected with amplifiers 57-2 and 57-3.

The output of the amplifier 57-1 is connected through a gate 60-1 with comparison circuits 61-1 and 61-3. Similarly, the outputs of the amplifiers 57-2 and 57-3 are respectively connected through gates 60-2 and 60-3 with comparison circuits 61-1 and 61-2; and 61-3 and 61-2. The gates 60-1, 60-2 and 60-3 are controlled by a pulse generating circuit such as a one-shot multivibrator 59 which is triggered by a phase detector 58, so that the gates 60-1 60-2 and 60-3 are opened only when the induction elements 4-1, 4-2 and 4-3 are in co-operation with the associated ones of the induction elements 5-1, 5-2 and 5-3. It should be noted that the gates 60-1, 60-2 and 60-3 may be omitted when mechanical designs permit such arrangements in that each of the elements 4-1, 4-2 and 4-3 is brought into cyclic co-operation only with the associated one of the elements 5-1, 5-2 and 5-3 but never with the other elements.

The comparison circuits 61-1, 61-2 and 61-3 are connected through diodes 62-1 and 62-3 with Schmitt circuits 63-1 and 63-2 which respectively allow positive and negative signals above predetermined threshold levels. The circuits 63-1 and 63-2 are connected with an OR circuit 64 which is in turn connected with an amplifier 65. The output of the amplifier 65 is used to turn a warning lamp 66 on.

The arrangement has been found as being effective in that, through adjustments of the amplifiers 57-1, 57-2 and 57-3, it is possible to adjust the levels of the amplifier outputs to a completely identical level under normal conditions, whereby accuracy of crack detection can be further enhanced.

The invention has thus been shown and described with reference to preferable embodiments, however, it should be noted that the invention is in no way limited to the details of the illustrated embodiments but changes and modifications may be made without departing from the scope of the appended claims.

We claim:

1. In rotary wing aircrafts including a stationary part and at least one rotor assembly having plurality of rotor blades, means for detecting cracks in the rotor blades, said detecting means comprising crack sensing means associated with each rotor blade so as to provide a change in an electrical property when a crack is produced in the rotor blade, first induction means provided on the rotor at least one for each rotor blade and connected with said crack sensing means to form circuit means of which impedance is changed in accordance with the change in the electrical property in the crack sensing means, second induction means provided on said stationary part of the rotary wing aircraft and adapted to cooperate with said first induction means, means for applying alternating power to one of the first and the second induction means to produce an output signal at the second induction means, means for discriminating the output signal of the second induction means to determine whether there is a crack in the rotor blade.

2. The crack detecting means in accordance with claim 1 in which said discriminating means comprises comparison circuit means for comparing the output signal corresponding to one of the rotor blades with that corresponding to another rotor blade.

3. The crack detecting means in accordance with claim 1 in which said crack sensing means includes induction coil means of which inductance is changed when a crack is produced in the associated rotor blade.

4. The crack detecting means in accordance with claim 1 in which said crack sensing means includes electrically conductive wire means which is attached to each rotor blade and adapted to be broken when a crack is produced in the associated rotor blade.

5. The crack detecting means in accordance with claim 1 which further includes counting means for producing an output signal when a predetermined number of crack signal is received.

6. In tandem rotor type rotary wing aircrafts including a stationary part and two rotor assemblies each having a plurality of rotor blades, means for detecting cracks in the rotor blades, said detecting means comprising crack sensing means associated with each rotor blade so as to provide a change in an electrical property when a crack is produced in the rotor blade, first induction means provided on the rotor at least one for each rotor blade and connected with said crack sensing means to form circuit means of which impedance is changed in accordance with the change in the electrical property in the crack sensing means, second induction means provided on said stationary part of the rotary wing aircraft and adapted to co-operate with said first induction means, means for applying alternating power to one of the first and the second induction means to produce an output signal at the second induction means, comparison circuit means for comparing the output signals corresponding to the rotor blades in one of the rotor assemblies with those corresponding to the rotor blades in the other rotor assembly to determine whether there is a crack in any of the rotor blades.

7. The crack detecting means in accordance with claim 1 which includes only one second induction means which is adapted to co-operate with all of the first induction means.

8. The crack detecting means in accordance with claim 1 which includes a plurality of second induction means, one for each first induction means, said second induction means being so arranged with respect to the first induction means that each second induction means co-operates to only associated one of the first induction means, so as to exclude any influence from the other first induction means.

9. The crack detecting means in accordance with claim 1 which includes a plurality of second induction means, one for each first induction means, gate means being provided for each of the second induction means so as to allow output signals which have been produced under influence of the associated first induction means only, but block any signals which have been produced under influence of the other first induction means.

* * * * *